(12) United States Patent
Leger

(10) Patent No.: US 9,875,474 B2
(45) Date of Patent: Jan. 23, 2018

(54) METHOD FOR SECURING A TRANSACTION PERFORMED BY BANK CARD

(71) Applicant: Compagnie Industrielle et Financiere d'Ingenierie "Ingenico", Paris (FR)

(72) Inventor: Michel Leger, Saint-Germain-en-Laye (FR)

(73) Assignee: INGENICO GROUP, Paris (FR)

( * ) Notice: Subject to any disclaimer, the term of this patent is extended or adjusted under 35 U.S.C. 154(b) by 401 days.

(21) Appl. No.: 14/599,155

(22) Filed: Jan. 16, 2015

(65) Prior Publication Data

US 2015/0199690 A1 Jul. 16, 2015

(30) Foreign Application Priority Data

Jan. 16, 2014 (FR) .................................... 14 50356

(51) Int. Cl.
*G06Q 20/40* (2012.01)
*G06Q 20/34* (2012.01)

(52) U.S. Cl.
CPC ....... *G06Q 20/40145* (2013.01); *G06Q 20/34* (2013.01); *G06Q 20/4012* (2013.01)

(58) Field of Classification Search
CPC ............ G06C 20/40145; G06Q 20/34; G06Q 20/4012; G06Q 20/1085; G06Q 20/341; G07F 19/20; G07F 7/1008
USPC .............................. 235/380, 379, 382, 382.5
See application file for complete search history.

(56) References Cited

U.S. PATENT DOCUMENTS

| 5,517,558 | A | 5/1996 | Schalk |
| 6,292,782 | B1 | 9/2001 | Weideman |
| 6,356,868 | B1 | 3/2002 | Yuschik et al. |
| 2007/0156684 | A1* | 7/2007 | Daugherty ............. G06F 21/32 |
| 2012/0330765 | A1 | 12/2012 | Fried et al. |
| 2015/0088514 | A1* | 3/2015 | Typrin .................... G06F 3/167 |
| | | | 704/249 |

FOREIGN PATENT DOCUMENTS

WO 2010025440 A2 3/2010

OTHER PUBLICATIONS

French Search Report dated Sep. 9, 2014 for corresponding French Patent Application No. 1450356, filed Jan. 16, 2014.

\* cited by examiner

*Primary Examiner* — Karl D Frech
(74) *Attorney, Agent, or Firm* — David D. Brush; Westman, Champlin & Koehler, P.A.

(57) ABSTRACT

A method is provided for securing a transaction made by bank card, the transaction involving a remote provision, by a user, of data existing in a bank card in his possession. The method includes: obtaining data existing in the bank card to be used, called textual data; obtaining at least one portion of the textual data in the form of an audio data stream, called a sound sample, resulting from reading the data existing in the bank card to be used; computing a current voice signature from said sound sample; comparing said current voice signature with a reference voice signature pre-recorded and associated with the textual data of the bank card; and when the reference voice signature differs from the current voice signature by a value greater than the first value defined by a predetermined parameter, for rejecting the transaction.

6 Claims, 4 Drawing Sheets

METHOD FOR SECURING A TRANSACTION PERFORMED BY BANK CARD

1. CROSS-REFERENCE TO RELATED APPLICATION

This Application claims priority from and the benefit of French Patent Application No. FR1450356, filed Jan. 16, 2014, the content of which is incorporated herein by reference in its entirety.

2. FIELD OF THE DISCLOSURE

The disclosure pertains to the field of the securing of transactions carried out by bank card. More particularly, the proposed technique can be used to improve the securing of transactions carried out by a user when his or her card is being used (for example by using a Smartphone, a tablet or a computer).

3. PRIOR ART

For many years now, bank cards have replaced classic means of payment such as cash or cheques in terms of volume of transaction. The bank card, by its massive use, is the preferred medium of payment for remote purchases, whether they are made online, on payment platforms or by telephone.

Many methods have been implemented to secure the use of bank cards in remote payment: encryption methods, integration into data cards to be provided of a visual trigram, etc.

Nonetheless, most of these methods cannot be used to verify the identity of the person using the data of the bank card (whether it is done online or by telephone). Indeed, behind a screen or behind a telephone set, it is very difficult to ascertain that the person giving the data of the card is truly its holder.

Naturally, transaction-locating methods have been proposed. Such methods are used to obtain a geographical zone in which the transaction is made: for example when the transaction is done online, by using a computer, a tablet, methods have been proposed to physically locate the computer or the terminal from which the transaction is made. These methods thus make it possible to detect fraudulent transactions by detecting a difference in country for example, between the place in which the terminal is situated and the usual place of residence of the bank-card holder. Such techniques have also been proposed for mobile terminals (telephones or smartphones): the presence of the communications terminal in a given geographical zone is detected in order to try and detect fraudulent use.

Such techniques effectively make it possible to respond to certain attempts at fraud, chiefly coming from foreign countries. However, these techniques do not make it possible to counter fraud situated in a geographical zone close to the usual geographical zone of use of the bank-card data. Typically, the prior art techniques do not enable the detection of inappropriate use, by a family member or by close contacts of the card-holder, of bank-card data belonging to this holder.

Thus, on the whole, the current methods are inefficient for detecting "local" fraud. Besides, the current methods are also on the whole inefficient for detecting a telephone fraud, i.e. when a user gives bank-card data to a telephone operator.

There is therefore a need for providing a method that can be used to identify the fact that an author of a remote transaction involving the supply of bank-card data is the holder of the bank card used.

4. SUMMARY

The proposed technique secures the use of card data during the payment made remotely, whether this is done online by using a website or by telephone, in contact with a human operator. The technique relates to a method for securing a transaction made by bank card, the transaction involving the providing remotely, by a user, of data existing in a bank card in his possession.

This method comprises:
- a step for obtaining data existing in the bank card to be used, called textual data;
- a step for obtaining at least one portion of the textual data in the form of an audio data stream, called a sound sample, resulting from the reading of the data existing in the bank card to be used;
- a step for computing a current voice signature from said sound sample;
- a step for comparing said current voice signature with a reference voice signature pre-recorded and associated with the textual data of the bank card; and
- when the reference voice signature differs from the current voice signature by a value greater than the first value defined by a predetermined parameter, a step for rejecting the transaction.

According to one particular embodiment, said step for obtaining said sound sample is implemented concomitantly with said step for obtaining said textual data when said textual data is communicated by telephone.

Thus, the data needed for the transaction for the user does not have to be repeated several times.

According to one particular embodiment, the method furthermore comprises:
- a step for obtaining a telephone number, used for the remote providing of textual data, called a current telephone number;
- a step for comparing the current telephone number with at least one reference telephone number pre-recorded and associated with said textual data of the bank card; and
- when the current telephone number is not identical to one of the reference telephone numbers, a step for rejecting the transaction.

Thus, in addition to the voice signature, there is a supplementary comparison element available for identifying the user of the bank-card data. The securing of the transaction is therefore further reinforced.

According to one particular embodiment, the step for rejecting the transaction when the current telephone number is not identical to one of the reference telephone numbers is implemented when the reference voice signature differs from the current voice signature by a value greater than a second value defined by the predetermined parameter.

Thus, the comparison of the telephone number comes into play as a secondary comparison criterion to identify the user of the bank-card data.

According to one particular embodiment, said step for obtaining said sound sample and said step for computing said current voice signature are implemented by using a communications terminal in the possession of said user.

According to one particular embodiment, the method then comprises the following steps:
- reception, by the communications terminal, of a request for transmission coming from a transaction management server;

display, by the communications terminal of a request for entering a personal identification code;

entry, by the user, of the personal identification code, and when the personal identification code is correct, transmission of the current voice signature to the management server.

Thus, the legitimate user of the bank-card data is not required to spell out this data aloud. The confidentiality of the transactions made in a public place is thus preserved.

In another embodiment, the technique also relates to a server for controlling a validity of a transaction involving the remote providing, by a user, of data appearing in his bank card.

Such a server comprises:

means for obtaining data existing in the bank card to be used, called textual data;

means for obtaining at least one portion of the textual data, in the form of a stream of audio data, called a sound sample, resulting from a reading of the data existing in the bank card to be used;

means for computing a current voice signature from current sound sample;

means for comparing said current voice signature with a reference voice signature pre-recorded and associated with said textual data of the bank card; and when the reference voice signature differs from the current voice signature by a value greater than a first value defined by a predetermined parameter, means for rejecting the transaction.

According to one implementation, the different steps of the methods according to the disclosure are implemented by one or more computer software programs, comprising software instructions to be executed by a data processor of a relay module according to the disclosure and being designed to command the execution of the different steps of the methods.

As a consequence, the disclosure also pertains to a program that can be executed by a computer or by a data processor, this program comprising instructions to command the execution of the steps of a method as mentioned here above.

This program can use any programming language whatsoever and can be in the form of source code, object code or a code that is intermediary between source code and object code, such as in a partially compiled form, or in any other desirable form whatsoever.

The disclosure also pertains to an information carrier readable by a data processor and comprising instructions of a program as mentioned here above.

The information carrier can be any entity or device whatsoever capable of storing the program. For example, the carrier can be a storage means such as a ROM, for example a CD-ROM or a microelectronic circuit ROM or again a magnetic recording means, for example a floppy disk or a hard disk drive.

Besides, the information carrier can be a transmissible carrier such as an optical or electrical signal which can be conveyed via an electrical or optical cable, by radio or other means. The program according to the disclosure can in particular be downloaded from an Internet type network.

As an alternative, the information carrier can be an integrated circuit in which the program is incorporated, the circuit being adapted to executing or being used in the execution of the method in question.

According to one embodiment, the disclosure is implemented by means of the software and/or software components. To this end, the term "module" can correspond in this document both to a software component and to a hardware component or a set of hardware or software components.

A software component corresponds to one or more computer programs, one or more sub-programs of a program or more generally to any element of a program or a software item capable of implementing a function or a set of functions, according to what has been described here above for the module concerned. Such a software component is executed by a data processor of a physical entity (a terminal, a server, a gateway, a router, etc) and is capable of accessing the hardware resources of this physical entity (memories, recording media, communications buses, input/output electronic boards, user interfaces, etc).

In the same way, a hardware component corresponds to any element or set of equipment or hardware capable of implementing a function or a set of functions according to what is described here below for the module concerned. It may be a programmable hardware component or a component with an integrated processor for the execution of software, for example an integrated circuit, a smartcard, a memory card, an electronic board for executing firmware, etc.

Each component of the above-described system naturally implements its own software modules.

The different embodiments mentioned here above can be combined with one another to implement one or more embodiments of the disclosure.

5. FIGURES

Other features and advantages shall appear more clearly from the following description of an embodiment, given by way of a simple, illustrative and non-exhaustive example and from the appended drawings, of which:

Figure 3:
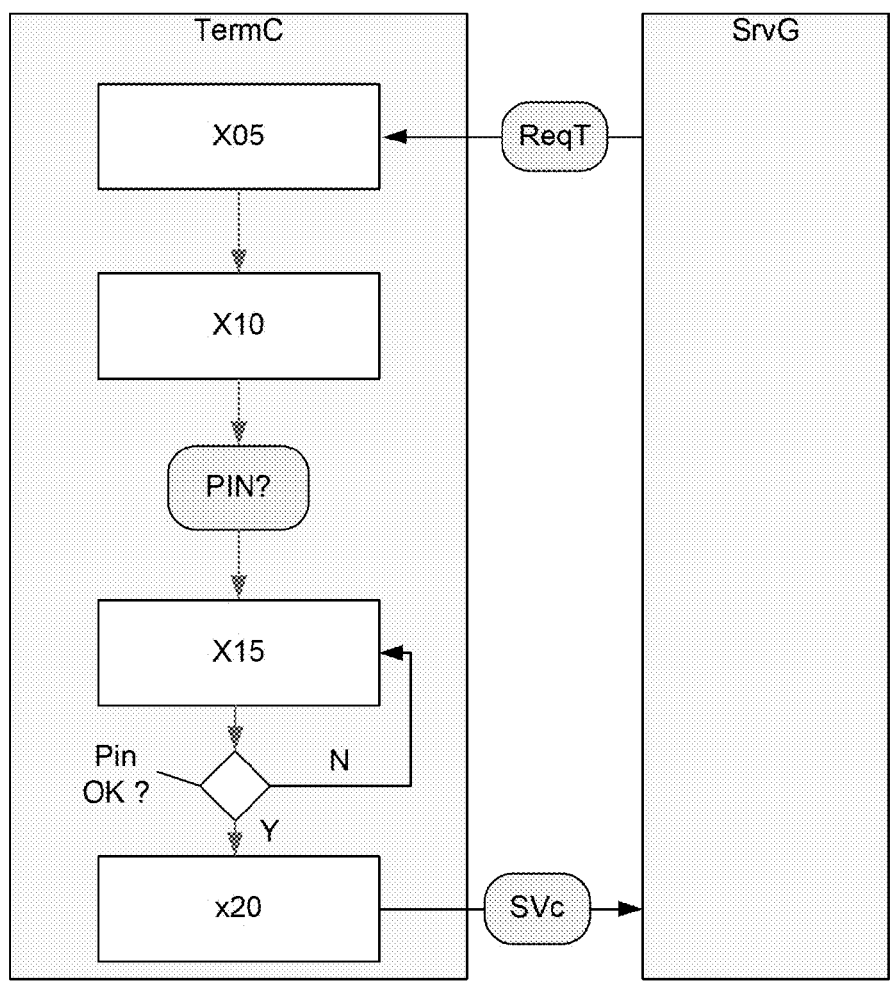
Figure 5:
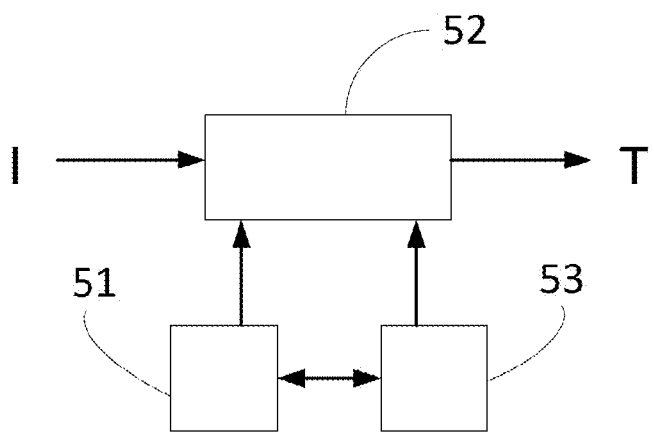
Figure 4:
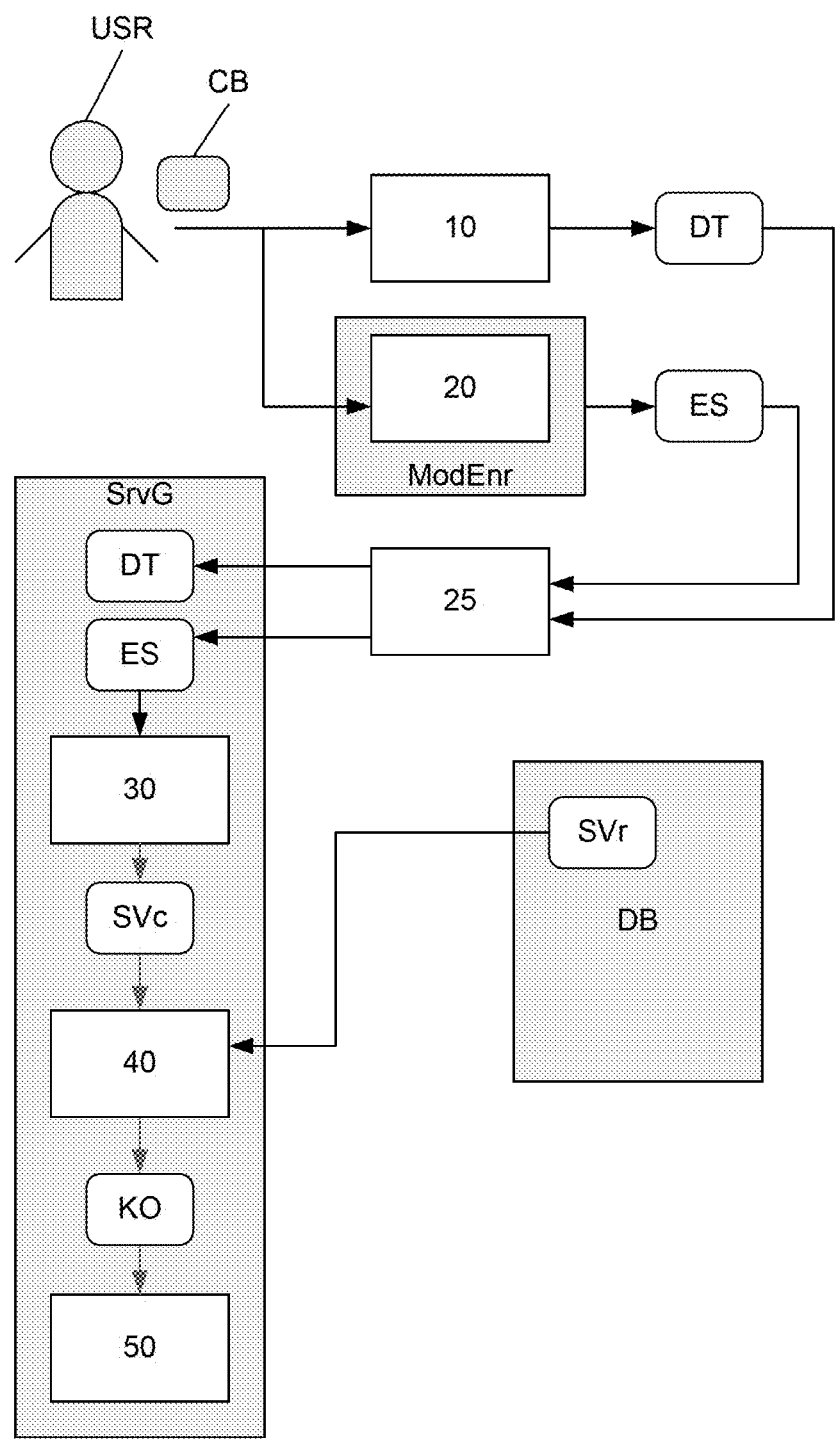

FIG. 3 describes the providing, by a communications terminal, of a pre-recorded current voice signature;

FIG. 4 schematically illustrates the component of a management server for implementing the proposed technique;

FIG. 5, is a diagram that illustrates control of validity of a transaction, from the viewpoint of the management server, according to an exemplary embodiment.

6. DETAILED DESCRIPTION

6.1. Reminder of the Principle of an Embodiment of the Disclosure

In the general principle of the method proposed, at least some of the data elements of this card are spelled out by the user at the time of the transaction. The immediate advantage obtained by this technique is obvious when the transaction is conducted by telephone: causing this data to be spelled out does not require any complementary action whether on the part of the user or on the part of the operator because the user is obliged to spell out this data to carry out a transaction.

Figure 1:
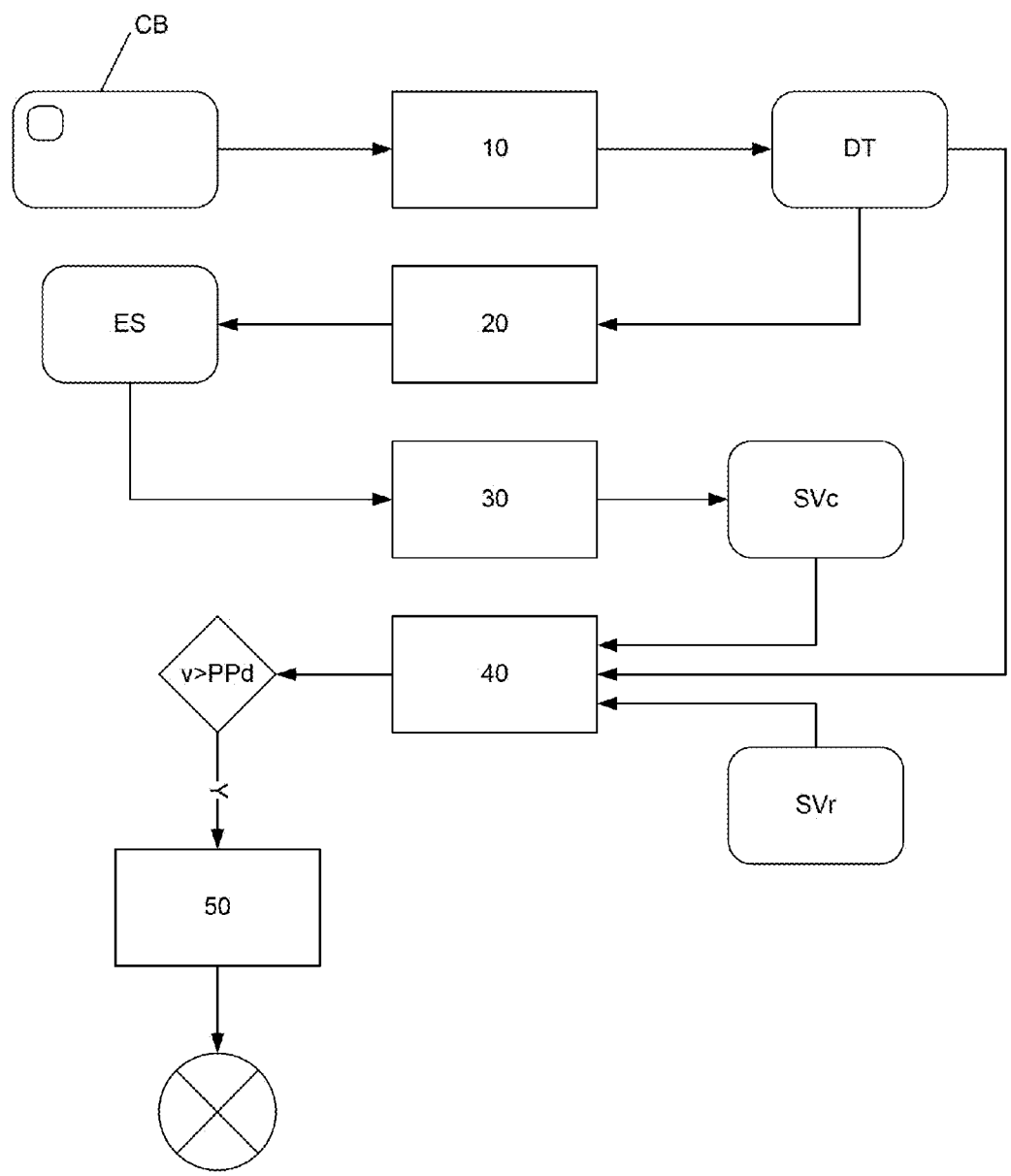
FIG. 1 is a block diagram of the technique proposed for the transmission of data.

The inventors have implemented a technique that can be used to take advantage of this situation. Typically, the technique implemented comprises the following steps, described with reference to FIG. 1, which take place at the time of the payment:

a step (10) for obtaining data, known as textual data (DT), existing in the bank card to be used (CB);

a step (20) for obtaining at least one portion of the textual data (DT) in the form of a stream of audio data, called a sound sample (ES) resulting from the reading of the data existing in the bank card to be used (CB);

a step (30) for computing a current voice signature (SVc) from said sound sample (ES);

a step (40) for comparing said current voice signature (SVc) with a reference voice signature (SVr) pre-recorded and associated with said textual data (DT) of the bank card; and when the reference voice signature (SVr) differs from the current voice signature (SVc) by a value greater than a first value defined by a predetermined parameter (PPd), a step (50) for rejecting the transaction.

Naturally, the reference signature and the current voice signature correspond to portions of text that are identical to it. These portions of text that are read can correspond to a set of textual data pieces or to some of them (for example only the number of the bank card, or only the visual cryptogram). Thus, the proposed technique provides for substantial reliability of the transaction. Indeed, the probability that the person could reproduce the card-holder's voice is relatively low. Typically, this case can occur when the user is recorded against his will, and when he makes the purchase in using the proposed method. However, to obtain good-quality recording, a fraudulent person must then be in special recording conditions: a non-noisy environment and proximity to the user. Now, remote purchases requiring the use of bank-card data are mostly carried out at the home of the card-holder himself or at the place of work itself. This fact makes it very difficult to hack into this type of place to reproduce the fraudulent recording conditions mentioned here above. Thus, the probability that the card-holder's voice will be misused is close to zero. Besides, in a situation where the payment would be made by telephone, the operator would be immediately informed of a change of voice between the voice of the fraudulent person having made the order for a piece of goods or services and that used to spell out the information of the bank card. A difference would immediately warn the operator who could then cancel the transaction.

The proposed technique can be implemented in different ways. More particularly, as explained in the second-last step of the method presented here above, this technique requires the use of a reference voice signature (SVr). This reference voice signature (SVr) is necessary to implement the technique. It can be acquired in several different ways. It is possible for example to acquire it when opening a bank account in a bank institution. Opening a bank account often requires the physical presence of the future bank-card holder. It is possible to record his voice at this occasion. It can also envisaged to obtain such a signature during the first use of the bank card. The institutions that provide bank cards often implement a specific procedure for the first use. It is possible to plan for this procedure to include a step for recording the owner's voice and for creating a reference voice signature (SVr on the basis of this signature. Finally, in another embodiment, it is possible to obtain this signature from an online recording by using a service specifically dedicated to this effect and available on the secured site of the bank institution. In another technique, the information of the owner's bank card is also read on a dedicated voice server. This voice server then generates the signature according to the voice that is read. In a complementary way, when the user is called on this voice server, the caller telephone number is recorded at the same time as the signing. This telephone number can then, in certain embodiments, be used to verify that it matches the telephone number with which a transaction is made.

Figure 2:
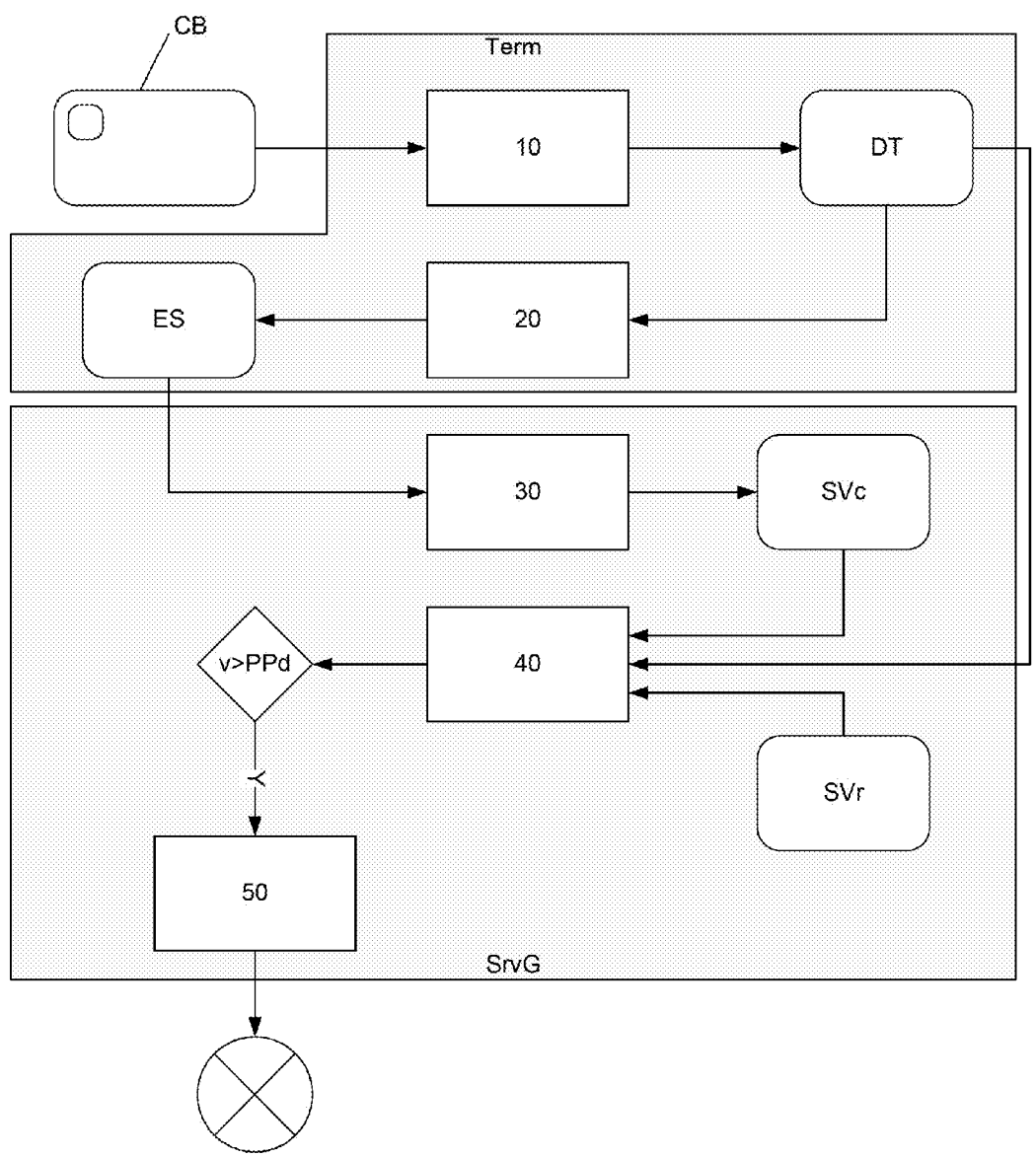
FIG. 2 is a block diagram of the technique proposed between a terminal and a management server.

In one particular embodiment, described with reference to FIG. 2, the proposed technique is implemented by using a management server (SrvG) for managing bank transactions. In this embodiment, prior to the acceptance of the transaction, the management server (SrvG) implements a step (40) for comparing the reference voice signature (SVr) with the current voice signature (SVc). The current voice signature (SVc) can be computed (30) by the management server (SrvG) itself: the management server (SrvG) then receives (20) the sound sample (ES) in addition to receiving (10) the textual data (DT) of the bank card. As an alternative, the current voice signature (SVc) can be computed (30) on another terminal (Term) connected to the management server (SrvG). In this case, it is directly the current voice signature (SVc) that is transmitted (20) in addition to the textual data (DT) of the bank card.

In one particular embodiment, described with reference to FIG. 3, the proposed technique is ingeniously implemented by using a terminal, such as for example a mobile communications terminal (TermC) of the Smartphone type, available to the card-holder. In this embodiment, a particular application is in charge of the preservation, in the secured memory space, of a voice signature playing the role of a current voice signature (SVc), associated with the card-holder. This current voice signature (SVc) has been generated for example on the basis of the card-holder's voice subsequently to the installation of a particular application on the communications terminal (TermC) (Android IOS or Windows phone type application) enabling the implementation, on the terminal side, of the described technique.

In this embodiment, the current voice signature (SVc) which is recorded within a communications terminal (TermC), is transmitted (X20) at the time of entry or providing of the bank card textual data (DT). This transmission (X20) of the signature can be made directly to the preliminarily presented bank transaction management server (SrvG). In this embodiment, for example, this management server (SrvG) thus receives the bank-card data coming from the product and/or service provider (if necessary using a transactional server which is spliced with the management server), while the current voice signature (SVc) is transmitted (X20) directly, from the user's terminal to the bank transaction management server (SrvG), by using a transactional server which is spliced with the management server. The advantage of this embodiment is that the card-holder (or user) does not need to speak aloud to spell out his bank identifiers. This embodiment is particularly suited to the purchases of goods and services by using a website for example. The method then comprises the following complementary steps:

reception (X05) by the communications terminal (TermC), of a request (ReqT) for transmission coming from the management server (SrvG) (or the transactional server);

display (X10) by the communications terminal (TermC) of a request for the entry of a personal identification code (PIN), entry (X15), by the user, of the personal identification code (PIN), and when the personal identification code is correct, transmission (X20) of the current voice signature (SVc) to the management server (SrvG).

Thus, prior to the transmission of the signature, the user must prove that he is in possession of a piece of unlocking data, such as a personal identification code, thus preventing the fraudulent use of the terminal should there be a theft of this terminal concomitantly with theft of the bank card itself. It is necessary to clearly note the difference between this technique and others which may require the entry of a personal identification code on a communications terminal (TermC) that is mobile. The purpose of this entry, in the context of the present technique, is not to authorize the transaction but to enable the transmission of a current voice signature (SVc) to the server. This is significantly different because it is really the management server that ultimately accepts or does not accept the transaction. The entry of the personal identification code by the user of the communications terminal (TermC) is not equivalent to acceptance of the transaction. This entry enables only the unlocking of the transmission of the current voice signature (SVc) towards the server.

6.2. Description of a First Embodiment

In this first embodiment of the proposed technique, described with reference to FIG. 4, a signature is preliminarily created by means of an access by the band-card holder to a voice server. This access is made at reception of the bank card prior to its first use. The card-holder receives the card and calls a particular telephone number. During this call, the voice server requests firstly the entry by the card owner of at least one piece of data identifying this card (for example the card number) and secondly a piece of unlocking data (for example the PIN code of the card). When these pieces of data have been entered, the voice server requests the card holder to spell out the data appearing in the card (for example the surname and name of the owner, the number of the card, its date of expiry and the three-digit security code). The voice server records the holder of the card when he spells out the data of this card. Using a recorded audio stream, the voice server implements a module for generating signatures that makes it possible to obtain a reference voice signal (SVr) of the holder's voice.

When the bank card is used, for example to make a purchase by telephone, the method described here above is implemented subsequently to the designation by the user of the goods or services to be purchased. The method comprises:
- a reading step for the reading, by the user, of the necessary data appearing in the bank card to be used (CB), this step being equivalent to the obtaining (10) of the data (DT) appearing in the bank card to be used (CB) to make the payment;
- a step for the obtaining (20) by a recording module (ModENr) as and when the user does his reading, of the data spelled out in the form of an audio data stream, delivering the sound sample (ES);
- a step (25) for transmitting said sound sample (ES) and text data to a management server (ServG);
- a step (30) for computing a current voice signature (SVc) from said sample;
- a step (40) for comparing said signature with a reference voice signature (SVr) preliminarily recorded within a database (DB) and associated with said data of the bank card; and
- when the reference voice signature (SVr) is significantly different from the current voice signature (SVc), a step (50) of rejection of the transaction.

Complementarily, the telephone operator to whom the card data has been spelled out can be informed of the nature of the rejection (i.e. holder authentication defect).

6.3. Complementary Characteristics

Although the proposed technique substantially reinforces the security of remote payments, it is still possible to increase it by recording complementary data. Indeed, apart from a comparison between the reference voice signature (SVr) and the current voice signature (SVc), it is also possible to compare the telephone numbers: indeed, during the creation of his bank account, the client generally gives one or more phone numbers serving as contacts with his bank or his payment services provider. In one complementary embodiment, the calling user's telephone number is also compared with the reference telephone numbers available to the bank.

When the order is made, an additional comparison is implemented. This additional comparison, which does not have a degree of importance as great as that of the reference voice signature, can nevertheless be taken into account in the event of doubt on the authenticity of the current voice signature. Indeed, the comparison of the voice signatures is necessarily a statistical and/or probabilistic comparison. Now, such a comparison of signatures can lead to high error rates. Since it is difficult to envisage the rejection of all the bank transactions on the grounds that the comparison of signatures is situated below a determined comparison threshold (for example below the 90% threshold), the complementary comparison of the number of telephone numbers removes any doubt as to the identity of the speaker.

Thus, for example, in one complementary embodiment, when the percentage of identity of the signatures ranges from 80% to 95% the telephone number of the caller serves as a secondary factor in deciding to accept or not accept the transaction: if the caller's number is not part of the list of reference numbers, the transaction will be rejected.

This complementary method augments the securing of remote payments even more.

6.4. Management Server

Referring to FIG. 5, a description is provided of a management server (SrvG) implemented to control the validity of a transaction, from the viewpoint of the management server (SrvG) according to the method described here above.

For example, the management server (SrvG) comprises a memory 51 constituted by a buffer memory, a processing unit 52, equipped for example with a microprocessor, and driven by the computer program 53, implementing a validity check process.

At initialization, the code instructions of the computer program 53 are for example loaded into a memory and then executed by the processor of the central processing unit 52. The central processing unit 52 inputs at least one piece of textual data and one piece of data representing a sample. The microprocessor of the processing unit 52 implements the steps of the method for controlling validity according to the instructions of the computer program 53.

To this end, the management server (SrvG) comprises, in addition to the buffer memory 51, means of communication such as network communications modules, means of data transmission and possibly an encryption processor.

These means can take the form of a particular processor implemented within the management server (SrvG), said processor being a secured processor. According to one particular embodiment, this management server (SrvG) implements a particular application which is in charge of receiving and decoding data, this application being for example provided by the manufacturer of the processor in question in order to enable the use of said processor. To this end, the processor comprises unique identification means. These unique identification means ensure the authenticity of the processor.

Besides, the management server (SrvG) furthermore comprises means for generating voice signatures and/or means for comparing voice signatures. These means generally take the form of communications interfaces enabling the exchange of data in communications networks, means for interrogating and updating the databases, means for comparing data. Depending on the embodiments, these different means can take the form of software or the form of hardware, for example the form of particular processors. This can be the case for example of the means for generating and comparing voice signatures which, for reasons of performance, can generally be dedicated processors specific to this task.

Although the present disclosure has been described with reference to one or more examples, workers skilled in the art will recognize that changes may be made in form and detail without departing from the scope of the disclosure and/or the appended claims.

The invention claimed is:

1. A method for securing a transaction made by bank card, the transaction involving a remote provision, by a user, of data existing in a bank card in the user's possession, the method comprising:
   obtaining data existing in the bank card to be used, called textual data;
   obtaining at least one portion of the textual data in the form of an audio data stream, called a sound sample, resulting from reading the data existing in the bank card to be used;
   computing a current voice signature from said sound sample;
   obtaining a telephone number, used for the remote providing of the textual data, called a current telephone number;
   comparing said current voice signature with a reference voice signature pre-recorded and associated with the textual data of the bank card;
   when the reference voice signature differs from the current voice signature by a value greater than a first value defined by a predetermined parameter, rejecting the transaction; and
   when the reference voice signature differs from the current voice signature by a value greater than a second value defined by the predetermined parameter:
      comparing the current telephone number with at least one reference telephone number pre-recorded and associated with said textual data of the bank card; and
      when the current telephone number is not identical to one of the at least one reference telephone number, rejecting the transaction.

2. The method according to claim 1, wherein said obtaining said sound sample is implemented concomitantly with obtaining said textual data when said textual data is communicated by telephone.

3. The method according to claim 1, wherein obtaining said sound sample and computing said current voice signature are implemented by a communications terminal in the possession of said user.

4. The method according to claim 3, wherein the method comprises:
   receiving, by the communications terminal, a request for transmission coming from a transaction management server;
   displaying, by the communications terminal a request for entering a personal identification code;
   receiving an entry, by the user, of the personal identification code, and
   when the personal identification code is correct, transmission of the current voice signature to the management server.

5. A server for controlling a validity of a transaction involving a remote providing, by a user, of data appearing in a bank card, wherein the server comprises:
   means for obtaining data existing in the bank card to be used, called textual data;
   means for obtaining at least one portion of the textual data, in the form of a stream of audio data, called a sound sample, resulting from a reading of the data existing in the bank card to be used;
   means for computing a current voice signature from said sound sample;
   means for obtaining a telephone number, used for the remote providing of the textual data, called a current telephone number;
   means for comparing said current voice signature with a reference voice signature pre-recorded and associated with said textual data of the bank card;
   means for rejecting the transaction when the reference voice signature differs from the current voice signature by a value greater than a first value defined by a predetermined parameter;
   means for performing the following acts when the reference voice signature differs from the current voice signature by a value greater than a second value defined by the predetermined parameter:
      comparing the current telephone number with at least one reference telephone number pre-recorded and associated with said textual data of the bank card; and
      rejecting the transaction when the current telephone number is not identical to one of the at least one reference telephone number.

6. A non-transmissible computer-readable medium comprising a computer program product, which comprises program code instructions to execute a method for securing a transaction made by bank card, when the instructions are executed by a processor, wherein the transaction involves a remote provision, by a user, of data existing in a bank card in the user's possession, the method comprising:
   obtaining data existing in the bank card to be used, called textual data;
   obtaining at least one portion of the textual data in the form of an audio data stream, called a sound sample, resulting from reading the data existing in the bank card to be used;
   computing a current voice signature from said sound sample;
   obtaining a telephone number, used for the remote providing of the textual data, called a current telephone number;
   comparing said current voice signature with a reference voice signature pre-recorded and associated with the textual data of the bank card;

when the reference voice signature differs from the current voice signature by a value greater than a first value defined by a predetermined parameter, rejecting the transaction; and when the reference voice signature differs from the current voice signature by a value greater than a second value defined by the predetermined parameter:
- comparing the current telephone number with at least one reference telephone number pre-recorded and associated with said textual data of the bank card; and
- when the current telephone number is not identical to one of the at least one reference telephone number, rejecting the transaction.

\* \* \* \* \*